(12) United States Patent
Jin et al.

(10) Patent No.: US 11,196,489 B2
(45) Date of Patent: Dec. 7, 2021

(54) METHOD FOR DESIGNING HIGH-SPEED MULTICHANNEL OPTICAL MODULE, AND OPTICAL MODULE

(71) Applicant: CREALIGHTS TECHNOLOGY INC CO., LTD, Jiangsu (CN)

(72) Inventors: Mengxi Jin, Jiangsu (CN); Yong Hu, Jiangsu (CN); Dehai Lu, Jiangsu (CN); Zhaoyang Hu, Jiangsu (CN)

(73) Assignee: CREALIGHTS TECHNOLOGY INC CO., LTD, Suzhou (CN)

( * ) Notice: Subject to any disclaimer, the term of this patent is extended or adjusted under 35 U.S.C. 154(b) by 9 days.

(21) Appl. No.: 16/637,030

(22) PCT Filed: Jul. 18, 2018

(86) PCT No.: PCT/CN2018/096102
§ 371 (c)(1),
(2) Date: Feb. 6, 2020

(87) PCT Pub. No.: WO2019/042035
PCT Pub. Date: Mar. 7, 2019

(65) Prior Publication Data
US 2020/0244364 A1 Jul. 30, 2020

(30) Foreign Application Priority Data
Aug. 28, 2017 (CN) .......................... 201710752296.6

(51) Int. Cl.
*G02B 6/36* (2006.01)
*H04B 10/40* (2013.01)
(Continued)

(52) U.S. Cl.
CPC ............. *H04B 10/40* (2013.01); *G02B 6/421* (2013.01); *G02B 6/4219* (2013.01);
(Continued)

(58) Field of Classification Search
CPC ...... H04B 10/40; H04B 10/506; H04B 10/25; G02B 6/421; G02B 6/4219; G02B 6/4249;
(Continued)

(56) References Cited

U.S. PATENT DOCUMENTS

| 8,540,437 B2* | 9/2013 | Lee ....................... G02B 6/4215 |
| | | 385/93 |
| 9,323,013 B2* | 4/2016 | Shao ...................... H04B 10/40 |
| 2019/0025528 A1* | 1/2019 | Sun ......................... G02B 6/428 |

FOREIGN PATENT DOCUMENTS

| CN | 201867521 | 6/2011 |
| CN | 105634608 | 6/2016 |

(Continued)

OTHER PUBLICATIONS

International Search Report and Written Opinion Issued in Corresponding PCT Patent Application No. PCT/CN2018/096102, dated Oct. 12, 2018. (English Translation).

*Primary Examiner* — Jennifer Doan
(74) *Attorney, Agent, or Firm* — Norton Rose Fulbright US LLP (57) ABSTRACT

A method for designing a high-speed multichannel optical module. Components in an optical module are classified into a circuit part and an optical path part according to functions, and the circuit part and the optical path part are separately processed and then assembled to be an optical module. Thus, modular production is implemented, and multiple parts can be processed at the same time, thereby improving the production efficiency. Moreover, if any fault occurs to either of the parts, the part can be independently replaced and maintained, thereby preventing the entire optical module from being scrapped, facilitating control of the production costs, and improving the yield rate. Also disclosed in the present invention is a high-speed multichannel optical mod-
(Continued)

ule, which is manufactured according to the design method above. The high-speed multichannel optical module employs a modular structure, and comprises a circuit part and an optical path part which are electrically connected. The structure is simple, and expansion and upgrade are facilitated.

4 Claims, 6 Drawing Sheets

(51) Int. Cl.
*G02B 6/42* (2006.01)
*G02B 6/43* (2006.01)
*H04B 10/25* (2013.01)
*H04J 14/02* (2006.01)

(52) U.S. Cl.
CPC ............. *G02B 6/4249* (2013.01); *G02B 6/43* (2013.01); *H04B 10/25* (2013.01); *H04J 14/02* (2013.01)

(58) Field of Classification Search
CPC .... G02B 6/43; G02B 6/28; G02B 6/36; H04J 14/02
See application file for complete search history.

(56) References Cited

FOREIGN PATENT DOCUMENTS

| CN | 107065083 | 8/2017 |
| CN | 206431319 | 8/2017 |
| CN | 107294606 | 10/2017 |
| CN | 107342817 | 11/2017 |
| WO | WO 2017035456 | 3/2017 |

* cited by examiner

METHOD FOR DESIGNING HIGH-SPEED MULTICHANNEL OPTICAL MODULE, AND OPTICAL MODULE

CROSS-REFERENCE TO RELATED APPLICATIONS

The present application is a national phase application under 35 U.S.C. 371 of International Application No. PCT/CN2018/096102, titled "METHOD FOR DESIGNING HIGH-SPEED MULTICHANNEL OPTICAL MODULE, AND OPTICAL MODULE," filed Jul. 18, 2018, which claims priority to Chinese Patent Application No. 201710752296.6, titled "METHOD FOR DESIGNING HIGH-SPEED MULTICHANNEL OPTICAL MODULE, AND OPTICAL MODULE," filed on Aug. 28, 2017, with the China National Intellectual Property Administration, the disclosures of which are both incorporated herein by reference in their entirety.

FIELD

The present disclosure relates to the field of optical communications, and in particular to a method for designing a high-speed multichannel optical module and an optical module.

BACKGROUND

With the continuous development of information technology, information traffic in communication networks increases rapidly. Optical communications networks are widely used to keep pace with the development trend of rapidly increased information traffic. With the continuous development of Internet industry in recent years, demands for optical communications related products increasingly grow all over the world. How to optimize manufacturing process of the optical communications related products and improve production efficiency of the optical communications related products becomes a significant research subject in the field. Furthermore, as public demands for information exchange efficiency increasingly grow, how to increase transmission capacities of the optical communications networks also becomes an urgent technical problem to be solved in the field.

As one of core components of an optical communications network, an optical transceiver module is inevitably required to be expanded or a structure of the optical transceiver module is completely changed in a process of improving transmission capacity of the optical communications network. If based on the conventional design scheme of the optical transceiver module, the structure of the transceiver module will become more complicated and production requirements will be increasingly high, which may result in an increase in production cost and a decrease in production efficiency. The conventional production process of the optical transceiver module is complicated and the optical transceiver module is difficult to be assembled. Further, processes must be performed in a predetermined order, and components of the optical transceiver module must be assembled in a predetermined order, resulting in a long production cycle and low production efficiency. In addition, a failure of any process in the conventional production process of the optical transceiver module will waste all previous processes, resulting in poor overall production performance and a low product yield. In summary, the conventional optical transceiver module has a problem of complicated structure, hence the production process of the optical transceiver module has disadvantages of low production efficiency and low product yield, which is not conducive to large-scale production of the optical transceiver module. Further, with the development of technology, a structure of an optical module will become increasingly complicated, and the above problem will be more and more significant.

SUMMARY

In view of this, an object of the present disclosure is to provide a method for designing a high-speed multichannel optical module. Components of the optical module are divided into a circuit portion and an optical portion based on functions. The circuit portion and the optical portion are separately manufactured, and then assembled to form the optical module, realizing modular production. Multiple portions may be concurrently manufactured, which is conducive to improving production efficiency. Further, any portion with a failure can be replaced and repaired separately without wasting the entire optical module, which is conducive to controlling production cost and improving product yield.

Another object of the present disclosure is to provide a high-speed multichannel optical module. The high-speed multichannel optical module is manufactured by using the above method. The high-speed multichannel optical module has a modular structure, and includes a circuit portion and an optical portion. The circuit portion is electrically connected to the optical portion. The structure of the high-speed multichannel optical module is simple, which is conducive to expanding and upgrading the high-speed multichannel optical module.

In order to achieve the above objects, a method for designing a high-speed multichannel optical module is provided according to the present disclosure. The method includes:

step (A), providing a circuit portion, where the circuit portion includes a PCBA;

step (B), providing an optical portion, where the optical portion includes a light transmitting portion, a wavelength division multiplexing portion, a light receiving portion and a wavelength division demultiplexing portion, connecting the light transmitting portion to the wavelength division multiplexing portion via an optical fiber, and connecting the light receiving portion to the wavelength division demultiplexing portion via an optical fiber; and step (C), electrically connecting the circuit portion to the optical portion, including electrically connecting the light transmitting portion to the PCBA and electrically connecting the light receiving portion to the PCBA.

A high-speed multichannel optical module is provided, which includes a PCBA, a light transmitting assembly, a wavelength division multiplexing assembly, a light receiving assembly, and a structural component. The light transmitting assembly is electrically connected to the PCBA. The light receiving assembly is electrically connected to the PCBA. The light transmitting assembly is connected to the wavelength division multiplexing assembly via an optical fiber. The PCBA, the light transmitting assembly, the wavelength division multiplexing assembly, and the light receiving assembly are each engaged with the structural component.

A high-speed multichannel optical module is provided, which includes a first assembly, a second assembly and a structural component. The first assembly includes a PCBA, a light receiving assembly, a wavelength division demultiplexer, and an optical fiber adapter. The light receiving assembly and the wavelength division demultiplexer are both arranged on the PCBA. The light receiving assembly is connected to the wavelength division demultiplexer via an optical fiber. The light receiving assembly is electrically connected to the PCBA. The wavelength division demultiplexer is connected to the optical fiber adapter via an optical fiber. The second assembly includes a housing, a flexible board, a light transmitting assembly, an optical fiber stub array, a wavelength division multiplexer, and an optical fiber adapter. The flexible board is electrically connected to the light transmitting assembly. The light transmitting assembly is electrically connected to the first assembly via the flexible board. The light transmitting assembly is detachably connected to the optical fiber stub array. The optical fiber stub array is connected to the wavelength division multiplexer via an optical fiber. The wavelength division multiplexer is connected to the optical fiber adapter via an optical fiber. The light transmitting assembly, the optical fiber stub array, and the wavelength division multiplexer are each mounted inside the housing.

Compared with the conventional technology, the method for designing a high-speed multichannel optical module and the optical module according to the present disclosure have the following advantages. In the method for designing a high-speed multichannel optical module, components of the optical module are divided into various portions in a modular manner. In a production process, the various portions of the optical module may be concurrently and separately manufactured, and then are assembled, which can effectively improve the production efficiency. Further, any portion with a failure can be replaced and repaired separately without wasting the entire optical module, so that failure cost can be reduced, thereby containing the production cost. The high-speed multichannel optical module has a modular structure, which simplifies an overall structure of the optical module and is conducive to expanding and upgrading of the optical module.

DETAILED DESCRIPTION OF EMBODIMENTS

Figure 1:
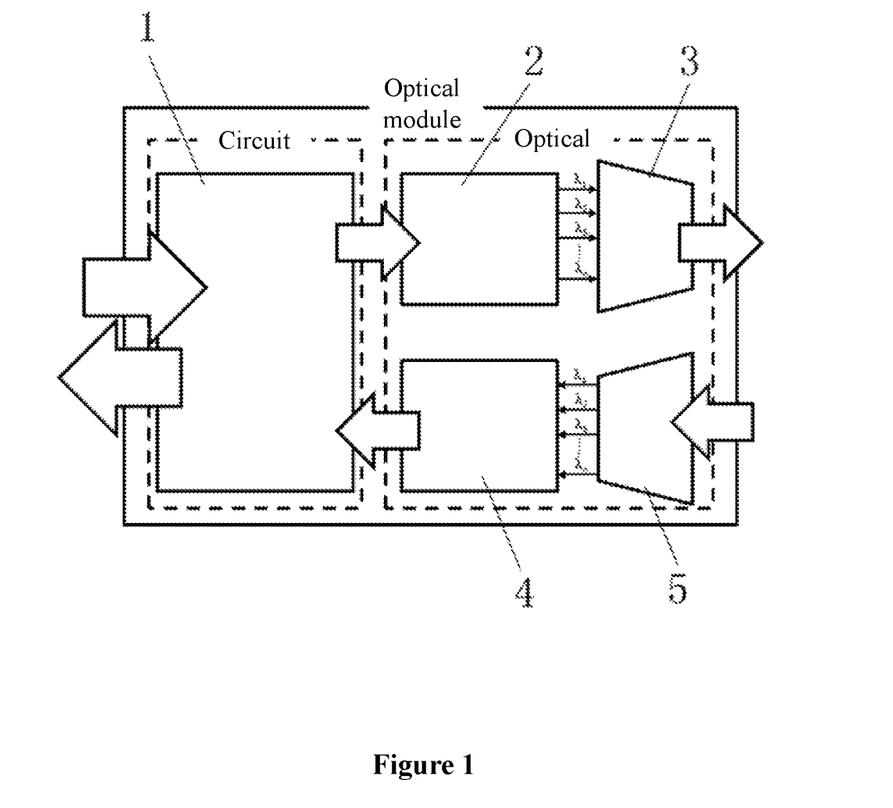
FIG. 1 is a schematic diagram of a functional structure of a high-speed multichannel optical module according to the present disclosure.

FIG. 1 is a schematic diagram of a functional structure of a high-speed multichannel optical module according to the present disclosure. The high-speed multichannel optical module includes a PCBA 1 designed with a circuit, a light transmitting portion 2, a wavelength division multiplexing portion 3, a light receiving portion 4 and a wavelength division demultiplexing portion 5. The PCBA 1 forms a circuit portion of the optical module. The light transmitting portion 2, the wavelength division multiplexing portion 3, the light receiving portion 4, and the wavelength division demultiplexing portion 5 together form an optical portion of the optical module. The light transmitting portion 2 is connected to the wavelength division multiplexing portion 3 via an optical fiber. The light receiving portion 4 is connected to the wavelength division demultiplexing portion 5 via an optical fiber. The light transmitting portion 2 is electrically connected to the PCBA 1. The light receiving portion 4 is electrically connected to the PCBA 1.

Figure 2:
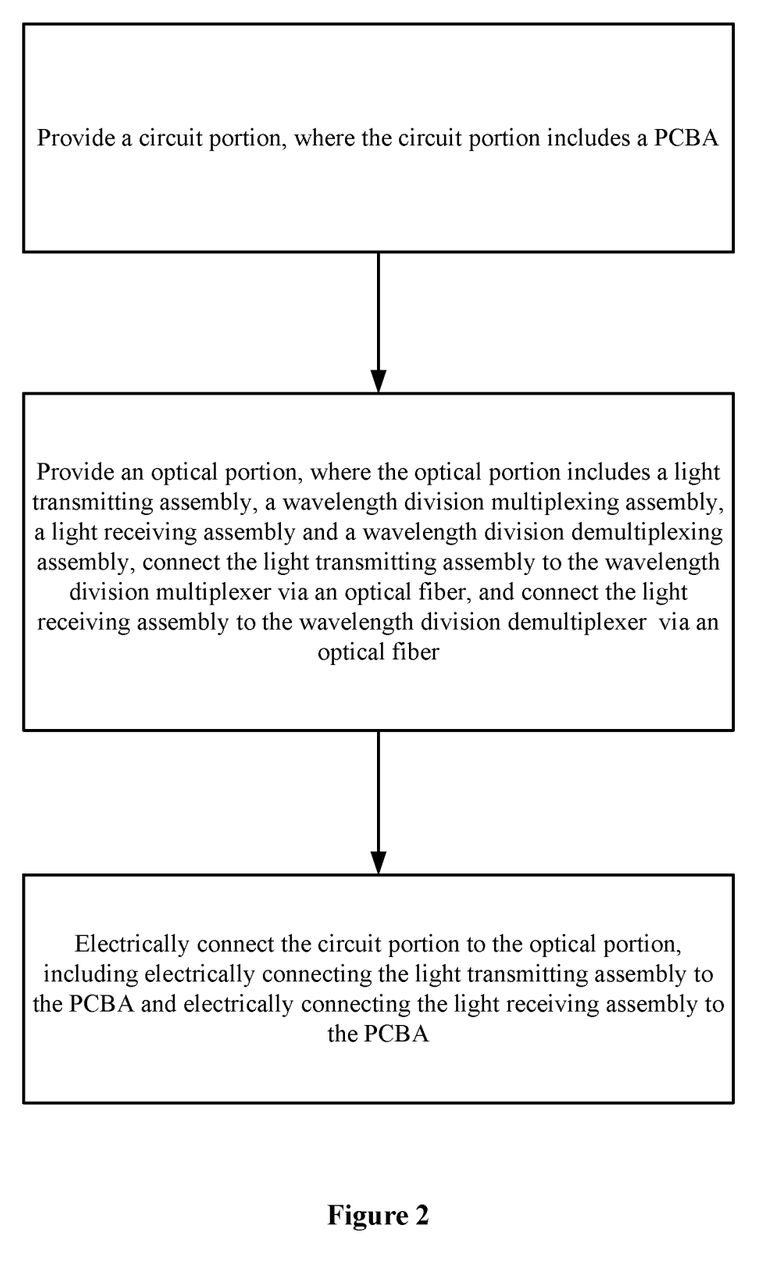
FIG. 2 is a flowchart of a method for designing a high-speed multichannel optical module according to the present disclosure.

Referring to FIG. 2, a method for designing a high-speed multichannel optical module according to the present disclosure includes the following steps of:

(A), providing a circuit portion, where the circuit portion includes a PCBA;

(B), providing an optical portion, where the optical portion includes a light transmitting assembly, a wavelength division multiplexing assembly, a light receiving assembly and a wavelength division demultiplexing assembly, connecting the light transmitting assembly to the wavelength division multiplexing assembly via an optical fiber, and connecting the light receiving assembly to the wavelength division demultiplexing assembly via an optical fiber; and (C), electrically connecting the circuit portion to the optical portion, including electrically connecting the light transmitting assembly to the PCBA and electrically connecting the light receiving assembly to the PCBA.

In the above steps, the PCBA, the light transmitting assembly, the wavelength division multiplexing assembly, the light receiving assembly, and the wavelength division demultiplexing assembly may be manufactured separately or in a partially combined manner, and are finally assembled to form the high-speed multichannel optical module after completion of the manufacture. Some specific combinations and manufacturing steps are described in the following preferred embodiments.

Figure 3:
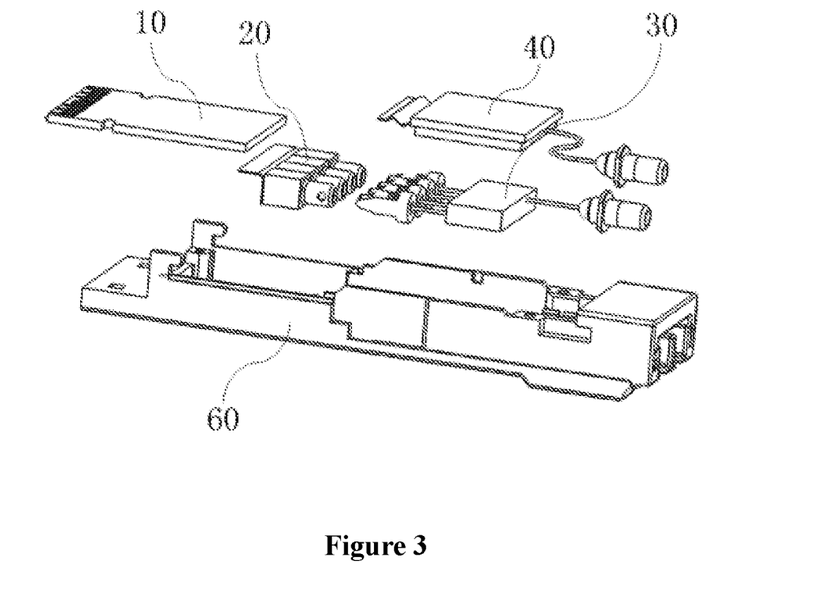
FIG. 3 is an exploded view of a high-speed multichannel optical module according to a first preferred embodiment of the present disclosure.

Reference is made to FIG. 3, which is an exploded view of a high-speed multichannel optical module according to a first preferred embodiment of the present disclosure. The high-speed multichannel optical module includes a PCBA 10, a light transmitting assembly 20, a wavelength division multiplexing assembly 30, a light receiving assembly 40, and a structural component 60. The light transmitting assembly 20 is electrically connected to the PCBA 10. The light receiving assembly 40 is electrically connected to the PCBA 10. The light transmitting assembly 20 is connected to the wavelength division multiplexing assembly 30 via an optical fiber. The PCBA 10, the light transmitting assembly 20, the wavelength division multiplexing assembly 30 and the light receiving assembly 40 are each engaged with the structural component 60. The light receiving assembly 40 is a combination of the light receiving portion 4 and the wavelength division demultiplexing portion 5. The PCBA 10, the light transmitting assembly 20, the wavelength division multiplexing assembly 30, and the light receiving assembly 40 of the high-speed multichannel optical module in this embodiment may be separately manufactured, and then assembled together, and finally engaged with the structural component 60 to form the high-speed multichannel optical module.

Figure 4:
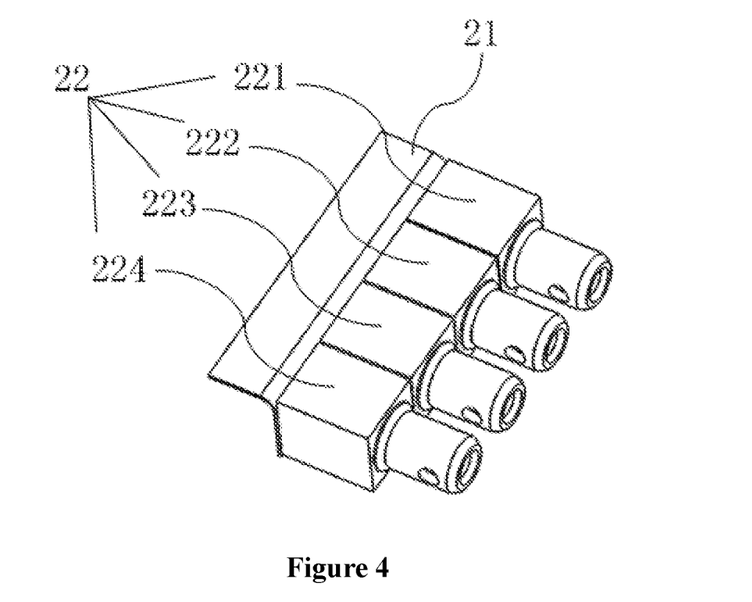
FIG. 4 is a schematic structural diagram of a light transmitting assembly of the high-speed multichannel optical module according to the first preferred embodiment to the present disclosure.

Referring to FIG. 4, the light transmitting assembly 20 includes a light transmitting flexible board 21 and a light transmitting array 22. The light transmitting flexible board 21 is electrically connected to the light transmitting array 22. The light transmitting array 22 is electrically connected to the PCBA 10 via the light transmitting flexible board 21. The light transmitting array 22 includes four light transmitting devices 221, 222, 223, and 224. The four light transmitting devices 221, 222, 223, and 224 are arranged in an array side by side. The four light transmitting devices 221, 222, 223 and 224 are each electrically connected to the light transmitting array 22 via the light transmitting flexible board 21. Further, each of the four light transmitting devices 221, 222, 223, and 224 is a mini TOSA. It should be noted that the number of light transmitting devices included in the light transmitting array 22 is not limited to four, but may be determined based on user demands and increased on an existing basis.

Figure 5:
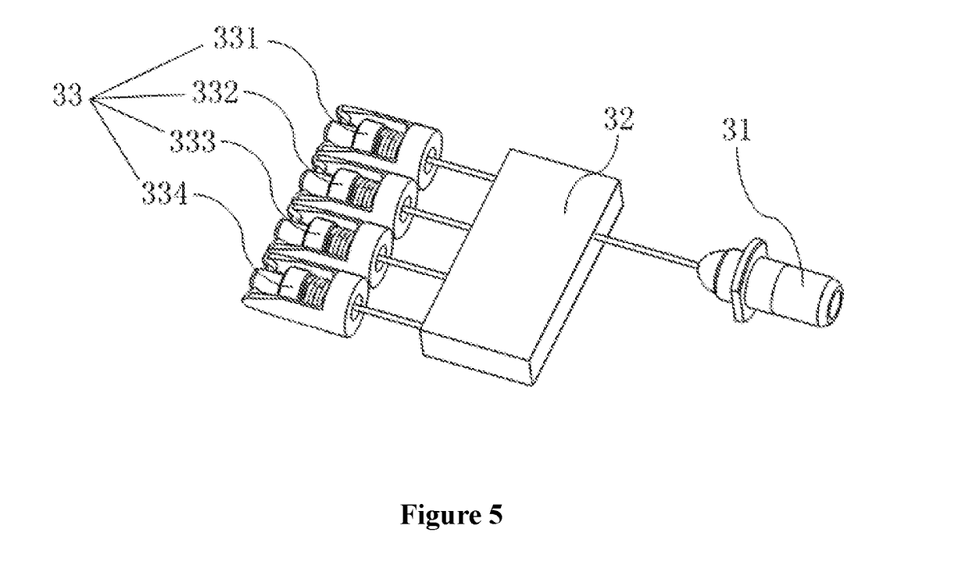
FIG. 5 is a schematic structural diagram of a wavelength division multiplexing assembly of the high-speed multichannel optical module according to the first preferred embodiment to the present disclosure.

Referring to FIG. 5, the wavelength division multiplexing assembly 30 includes a first optical fiber adapter 31, a wavelength division multiplexer 32, and an optical fiber stub array 33. The first optical fiber adapter 31 is connected to the wavelength division multiplexer 32 via an optical fiber. The wavelength division multiplexer 32 is connected to the optical fiber stub array 33 via an optical fiber. The optical fiber stub array 33 is detachably connected to the light transmitting array 22. The optical fiber stub array 33 includes four optical fiber stubs 331, 332, 333, and 334. The four optical fiber stubs 331, 332, 333, and 334 are arranged in an array side by side. Each of the four optical fiber stubs 331, 332, 333, and 334 is connected to the wavelength division multiplexer 32 via an optical fiber. The four optical fiber stubs 331, 332, 333, and 334 are detachably connected to the four light transmitting devices 221, 222, 223, and 224 in a one-to-one correspondence. Since the optical fiber stubs of the optical fiber stub array 33 are arranged in one-to-one correspondence with the light transmitting devices of the light transmitting array 22, the number of optical fiber stubs of the optical fiber stub array 33 is not limited to four either, but may be determined based on the user demands and increased on an existing basis.

Figure 6:
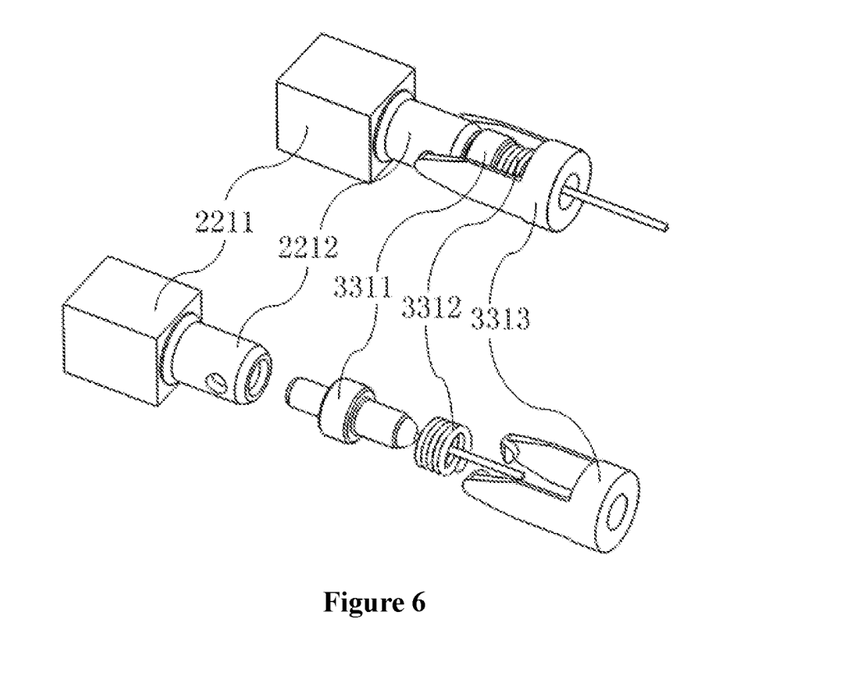
FIG. 6 is a schematic diagram of a snap-fit connection between the light transmitting assembly and the wavelength division multiplexing assembly of the high-speed multichannel optical module according to the first preferred embodiment to the present disclosure.

Reference is made to FIG. 6, which shows a snap-fit connection between the light transmitting device 221 and the optical fiber stub 331. It should be noted that the light transmitting devices 222, 223, 224 are respectively connected to the optical fiber stubs 332, 333, 334 by the same snap-fit connection as that between the light transmitting device 221 and the optical fiber stub 331. The light transmitting device 221 includes a body 2211 and an optical fiber interface 2212. The body 2211 is connected to the optical fiber interface 2212. The body 2211 is detachably connected to the optical fiber stub 331 via the optical fiber interface 2212. The optical fiber stub 331 includes a stub 3311, a spring 3312, and a snap-fit component 3313. The stub 3311 and the spring 3312 are nested inside the snap-fit component 3313. One end of the stub 3311 is inserted in the optical fiber interface 2212 and another end of the stub 3311 is connected to the wavelength division multiplexer 32 via an optical fiber when the light transmitting device 221 is connected to the optical fiber stub 331. The snap-fit component 3313 is fixedly engaged with the optical fiber interface 2212. The spring 3312, when being pressed, limits the position of the stub 3311, to avoid an optical path deviation due to a displacement of the stub 3311.

Figure 7:
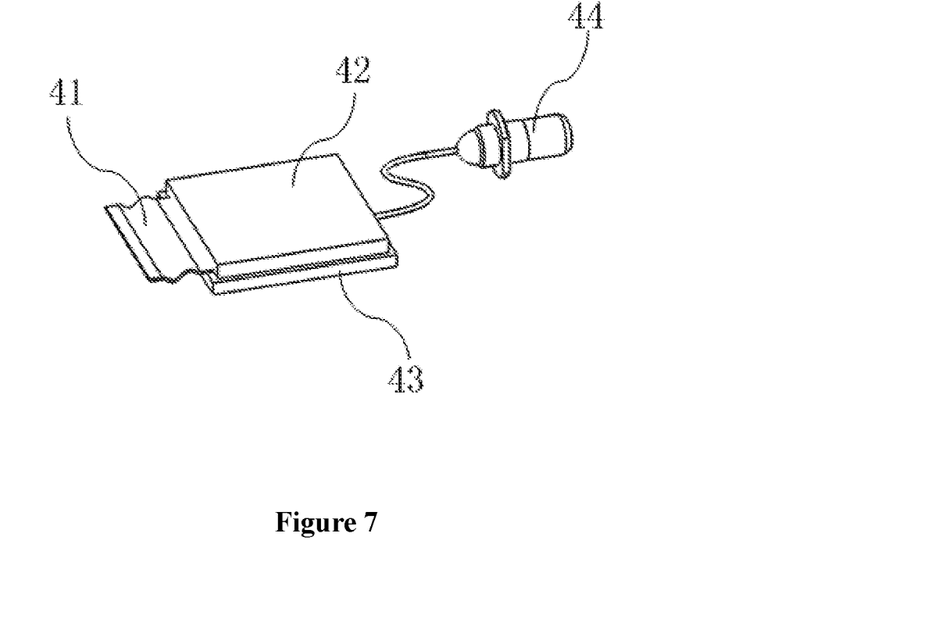
FIG. 7 is a schematic structural diagram of a light receiving assembly of the high-speed multichannel optical module according to the first preferred embodiment to the present disclosure.

Referring to FIG. 7, the light receiving assembly 40 includes a light receiving flexible board 41, a wavelength division demultiplexer 42, a PCB sub-board 43, and a second optical fiber adapter 44. The second optical fiber adapter 44 is connected to the wavelength division demultiplexer 42 via an optical fiber. The wavelength division demultiplexer 42 is electrically connected to the PCB sub-board 43. The PCB sub-board 43 is electrically connected to the light receiving flexible board 41. The PCB sub-board is electrically connected to the PCBA 10 via the light receiving flexible board 41.

The high-speed multichannel optical module in the first preferred embodiment is manufactured by the following steps of:

(1), manufacturing the PCBA, the light transmitting assembly, the wavelength division multiplexing assembly, the light receiving assembly, and the structural component separately;

(2), connecting the light transmitting assembly to the wavelength division multiplexing assembly via a snap-fit connection;

(3), connecting the PCBA to the light transmitting assembly via the light transmitting flexible board, and connecting the PCBA to the light receiving assembly via the light receiving flexible board; and (4), engaging the combined PCBA, light transmitting assembly, wavelength division multiplexing assembly and light receiving assembly with the structural component.

Figure 8:
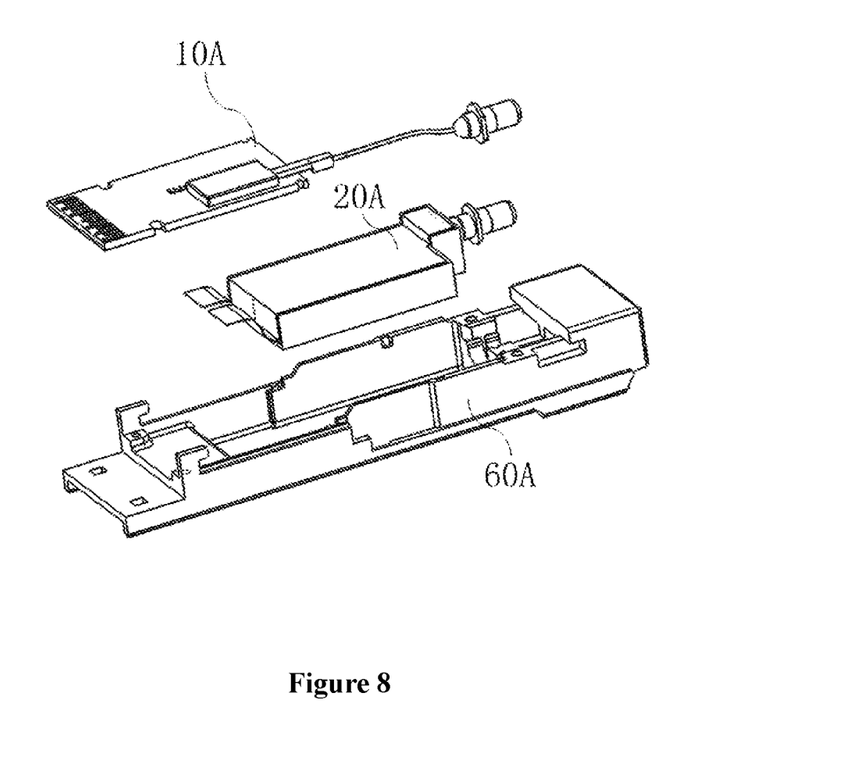
FIG. 8 is an exploded view of a high-speed multichannel optical module according to a second preferred embodiment of the present disclosure.

Reference is made to FIG. 8, which is an exploded view of a high-speed multichannel optical module according to a second preferred embodiment of the present disclosure. The high-speed multichannel optical module includes a first assembly 10A, a second assembly 20A, and a structural component 60A. The first assembly 10A includes a PCBA, a light receiving assembly, a wavelength division demultiplexer, and an optical fiber adapter. The light receiving assembly and the wavelength division demultiplexer are both arranged on the PCBA. The light receiving assembly is connected to the wavelength division demultiplexer via an optical fiber. The light receiving assembly is electrically connected to the PCBA. The wavelength division demultiplexer is connected to the optical fiber adapter via an optical fiber. It can be seen that the first assembly 10A is a combination of the PCBA 1, the light receiving portion 4, and the wavelength division demultiplexing portion.

Figure 9:
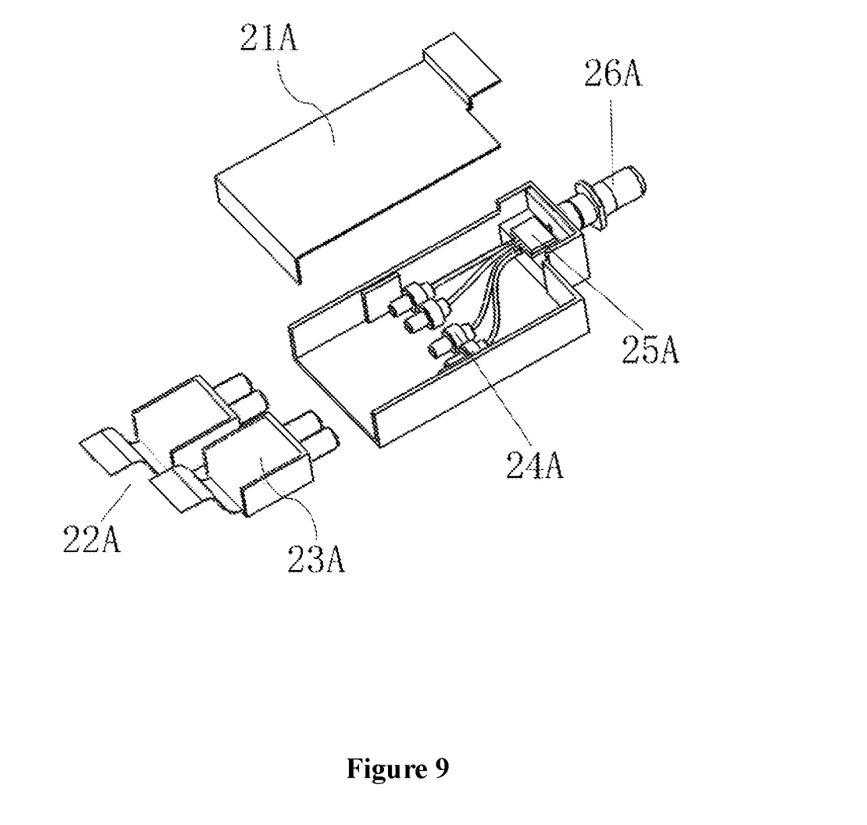
FIG. 9 is a schematic structural diagram of a light transmitting assembly of the high-speed multichannel optical module according to the second preferred embodiment to the present disclosure.

Referring to FIG. 9, the second assembly 20A includes a housing 21A, a flexible board 22A, a light transmitting assembly 23A, an optical fiber stub array 24A, a wavelength division multiplexer 25A, and an optical fiber adapter 26A. The flexible board 22A is electrically connected to the light transmitting assembly 23A. The light transmitting assembly 23A is electrically connected to the first assembly 10A via the flexible board 22A. The light transmitting assembly 23A is detachably connected to the optical fiber stub array 24A. The optical fiber stub array 24A is connected to the wavelength division multiplexer 25A via an optical fiber. The wavelength division multiplexer 25A is connected to the optical fiber adapter 26A via an optical fiber. The light transmitting assembly 23A, the optical fiber stub array 24A, and the wavelength division multiplexer 25A are each mounted inside the housing 21A. It can be seen that the second assembly 20A is a combination of the light transmitting portion 2 and the wavelength division multiplexing portion 3.

The high-speed multichannel optical module in the second preferred embodiment is manufactured by the following steps of:
(1), manufacturing the first assembly, the second assembly, and the structural component separately;
(2), combining the first assembly and the second assembly via the flexible board; and
(3), engaging the combined first assembly and second assembly with the structural component.

It should be noted that the structural component 60 described herein refers to a structural body as a housing of an optical module product, and plays the role of encapsulating, supporting and protecting inner structures.

The embodiments of the present disclosure are described above, so that those skilled in the art can implement or use the present disclosure. Various modifications to the embodiments are obvious to those skilled in the art, and general principles defined in this specification may be implemented in other embodiments without departing from the spirit or scope of the present disclosure. Therefore, the present disclosure is not limited to the embodiments described in this specification but accords with the widest scope that complies with the principles and novelty disclosed in this specification.

The invention claimed is:

1. A high-speed multichannel optical module comprising: a PCBA, a light transmitting assembly, a wavelength division multiplexing assembly, a light receiving assembly, and a structural component, wherein the light transmitting assembly is electrically connected to the PCBA, the light receiving assembly is electrically connected to the PCBA, the light transmitting assembly is connected to the wavelength division multiplexing assembly via an optical fiber, and the PCBA, the light transmitting assembly, the wavelength division multiplexing assembly, and the light receiving assembly are each engaged with the structural component;

wherein:
the light transmitting assembly comprises a light transmitting flexible board and a light transmitting array, the light transmitting flexible board is electrically connected to the light transmitting array, and the light transmitting array is electrically connected to the PCBA via the light transmitting flexible board;
the light receiving assembly comprises a light receiving flexible board, a wavelength division demultiplexer, a PCB sub-board, and a second optical fiber adapter;
the light transmitting array comprises at least two light transmitting devices, the light transmitting devices are arranged in an array side by side, and each of the light transmitting devices is electrically connected to the light transmitting array via the light transmitting flexible board;
the wavelength division multiplexing assembly comprises a first optical fiber adapter, a wavelength division multiplexer, and an optical fiber stub array, the first optical fiber adapter is connected to the wavelength division multiplexer via an optical fiber, the wavelength division multiplexer is connected to the optical fiber stub array via an optical fiber, the optical fiber stub array is detachably connected to the light transmitting array, the optical fiber stub array comprises at least two optical fiber stubs, the optical fiber stubs are arranged in an array side by side, each of the optical fiber stubs is connected to the wavelength division multiplexer via an optical fiber, and the optical fiber stubs are detachably connected to the light transmitting devices in a one-to-one correspondence;
the light transmitting device comprises a body and an optical fiber interface, the body is connected to the optical fiber interface; and
the optical fiber stub comprises a stub, a spring, and a snap-fit component, the stub and the spring are nested inside the snap-fit component, one end of the stub is inserted in the optical fiber interface and another end of the stub is connected to the wavelength division multiplexer via an optical fiber when the light transmitting device is connected to the optical fiber stub, and the snap-fit component is fixedly engaged with the optical fiber interface.

2. The high-speed multichannel optical module according to claim 1, wherein the second optical fiber adapter is connected to the wavelength division demultiplexer via an optical fiber, the wavelength division demultiplexer is electrically connected to the PCB sub-board, the PCB sub-board is electrically connected to the optical receiving flexible board, and the PCB sub-board is electrically connected to the PCBA via the light receiving flexible board.

3. The high-speed multichannel optical module according to claim 1, wherein each of the light transmitting devices is a mini TOSA.

4. A method for manufacturing the high-speed multichannel optical module according to claim 1, comprising:
manufacturing the PCBA, the light transmitting assembly, the wavelength division multiplexing assembly, the light receiving assembly, and the structural component separately;
connecting the light transmitting assembly to the wavelength division multiplexing assembly via a snap-fit connection;
connecting the PCBA to the light transmitting assembly via the light transmitting flexible board, and connecting the PCBA to the light receiving assembly via the light receiving flexible board; and
engaging the connected PCBA, light transmitting assembly, wavelength division multiplexing assembly and light receiving assembly with the structural component.

* * * * *